(12) United States Patent
Watanabe et al.

(10) Patent No.: US 11,693,261 B2
(45) Date of Patent: Jul. 4, 2023

(54) FOCUS ADJUSTING TOOL AND FOCUS ADJUSTING SET

(71) Applicant: Konica Minolta, Inc., Tokyo (JP)

(72) Inventors: Yoshikazu Watanabe, Toyohashi (JP); Takaki Uemura, Seto (JP); Sotaro Yokota, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 289 days.

(21) Appl. No.: 17/245,499

(22) Filed: Apr. 30, 2021

(65) Prior Publication Data

US 2021/0364825 A1 Nov. 25, 2021

(30) Foreign Application Priority Data

May 19, 2020 (JP) .................................. 2020-087391

(51) Int. Cl.
*G02C 7/08* (2006.01)
*G02B 7/10* (2021.01)

(52) U.S. Cl.
CPC ............. *G02C 7/083* (2013.01); *G02B 7/102* (2013.01); *G02C 7/088* (2013.01)

(58) Field of Classification Search
CPC ......... G02C 7/083; G02C 7/088; G02B 7/102
USPC ........................... 351/41, 57, 159.01, 159.39
See application file for complete search history.

(56) References Cited

U.S. PATENT DOCUMENTS

| | | | | | |
|---|---|---|---|---|---|
| 4,929,075 A | * | 5/1990 | Eliakim | ................. | G02C 7/088 351/59 |
| 6,061,189 A | * | 5/2000 | Caplan | .................... | G02C 7/088 351/158 |
| 6,142,630 A | * | 11/2000 | Koester | ................... | A61F 9/009 351/219 |
| 6,799,847 B2 | * | 10/2004 | Caplan | .................. | G02C 5/045 351/158 |

FOREIGN PATENT DOCUMENTS

| | | |
|---|---|---|
| JP | 2014-038302 A | 2/2014 |
| JP | 2014-134782 A | 7/2014 |
| JP | 2014-157197 A | 8/2014 |
| JP | 2015-052772 A | 3/2015 |
| JP | 2017-523445 A | 8/2017 |
| JP | 2018-525672 A | 9/2018 |
| WO | 2018/168570 A1 | 9/2018 |
| WO | 2018/168644 A1 | 9/2018 |

* cited by examiner

*Primary Examiner* — Tuyen Tra
(74) *Attorney, Agent, or Firm* — Lucas & Mercanti, LLP

(57) ABSTRACT

A focus adjusting tool used to perform an initial setting for a pair of autofocus eyeglasses includes an adjusting lens that refracts reflected light from a visual object, a housing including an inner space that allows a parallel movement of the adjusting lens, an adjusting unit that adjusts a position of the adjusting lens inside the housing, and a first end and a second end in a moving direction of the adjusting lens. The first end is provided with a hole for visually observing a visual object through a power variable lens of the pair of autofocus eyeglasses. The adjusting lens adjusts, in response to the position thereof inside the housing, an incident angle of the reflected light from the visual object into the power variable lens, the visual object being located on the side of the second end.

10 Claims, 8 Drawing Sheets

FOCUS ADJUSTING TOOL AND FOCUS ADJUSTING SET

The entire disclosure of Japanese Patent Application No. 2020-087391, filed on May 19, 2020 is incorporated herein by reference in its entirety.

BACKGROUND

Technological Field

The present disclosure generally relates to the power adjustment of lenses of a pair of autofocus eyeglasses, and more particularly relates to a focus adjusting tool for adjusting the power of lenses of a pair of autofocus eyeglasses, or a focus adjusting set composed of the pair of autofocus eyeglasses and the focus adjusting tool.

Description of the Related Art

The pair of autofocus eyeglasses includes a power variable lens, and is configured to adjust the power of the power variable lens in accordance with the eyesight of a user or a distance from the pair of autofocus eyeglasses to a visual object. Therefore, the same pair of autofocus eyeglasses may be used by different users irrespective of the eyesight of each user.

However, even if the distance from the pair of autofocus eyeglasses to the visual object is the same, the optimal power of the power variable lens may be different depending on the visual acuity of the user. Therefore, the user needs to preliminarily set the power of the power variable lens relative to each distance from the pair of autofocus eyeglasses to the visual object as an initial setting.

Regarding the power adjustment of a lens of a pair of autofocus eyeglasses, for example, Japanese Laid-Open Patent Publication No. 2015-052772 discloses such an eyesight correction apparatus that includes a first optical system or a second optical system provided with both a solid lens and a variable focus lens, wherein the solid lens and the variable focus lens are configured such that when a user suffering from a refractive disorder in eyes looks at a predetermined visual object through the solid lens and the variable focus lens, the user may clearly and visually recognize the predetermined visual object, or provided with a variable focus lens, wherein the variable focus lens is configured in accordance with the eyesight of a user such that when a user looks at a predetermined visual object through the variable focus lens in a state that no voltage is applied to electrodes that drive the variable focus lens, the user may clearly and visually recognize the predetermined visual object (see, for example, the abstract).

Other techniques relating to the power adjustment for a lens of a pair of autofocus eyeglasses are disclosed in, for example, Japanese Laid-Open Patent Publication No. 2014-157197, Japanese Laid-Open Patent Publication No. 2014-134782, Japanese Laid-Open Patent Publication No. 2014-038302, Japanese National Patent Publication No. 2018-525672, Japanese National Patent Publication No. 2017-523445, WO 2018/168644, and WO 2018/168570.

SUMMARY

According to the techniques disclosed in Japanese Laid-Open Patent Publication No. 2014-157197, Japanese Laid-Open Patent Publication No. 2014-134782, Japanese Laid-Open Patent Publication No. 2014-038302, Japanese National Patent Publication No. 2018-525672, Japanese National Patent Publication No. 2017-523445, WO 2018/168644, and WO 2018/168570, the user is required to reposition the visual object several times during the initial setting of the power of the power variable lens. As a result, there is a possibility that the power of the power variable lens is not accurately adjusted due to the position deviation or the like at the time of positioning the visual object. Therefore, it is demanded to complete the initial setting of the power of the power variable lens without the user repositioning the visual object.

To achieve at least one of the abovementioned objects, according to an aspect of the present disclosure, a focus adjusting tool reflecting one aspect of the present disclosure includes an adjusting lens that refracts reflected light from a visual object, a housing including an inner space that allows a parallel movement of the adjusting lens, an adjusting unit that adjusts a position of the adjusting lens inside the housing, and a first end and a second end in a movement direction of the adjusting lens. The first end is provided with a hole for visually observing a visual object via a power variable lens of a pair of autofocus eyeglasses. The adjusting lens adjusts, in response to the position thereof inside the housing, an incident angle of the reflected light from the visual object into the power variable lens, the visual object being located on the side of the second end.

To achieve at least one of the abovementioned objects, according to an aspect of the present disclosure, a focus adjusting set reflecting one aspect of the present disclosure includes a pair of autofocus eyeglasses and a focus adjusting tool. The pair of autofocus eyeglasses include a power variable lens, a power adjusting unit that adjusts the power of the power variable lens, a storage unit that stores power information of the power variable lens, and a control unit that controls the pair of autofocus eyeglasses. The focus adjusting tool includes an adjusting lens that refracts reflected light from a visual object, a housing including an inner space that allows a parallel movement of the adjusting lens, an adjusting unit that adjusts a position of the adjusting lens inside the housing, a display unit that displays position information of the visual object relative to the power variable lens, and a first end and a second end in a movement direction of the adjusting lens. The first end is provided with a hole for visually observing the visual object via the power variable lens. The adjusting lens adjusts, in response to the position thereof inside the housing, an incident angle of the reflected light from the visual object into the power variable lens, the visual object being located on the side of the second end. The control unit is configured to acquire first position information displayed by the display unit and first power information corresponding to the first position information from the power adjusting unit, acquire second position information displayed by the display unit and second power information corresponding to the second position information from the power adjusting unit, and store the first and second power information for adjusting the power of the power variable lens and the first and second position information in the storage unit.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

The advantages and features provided by one or more embodiments of the present disclosure will become more fully understood from the detailed description and the appended drawings hereinafter. Note that the appended drawings are given by way of illustration only, and thus are not intended as a definition of the limits of the present disclosure.

DETAILED DESCRIPTION OF EMBODIMENTS

Figure 1:
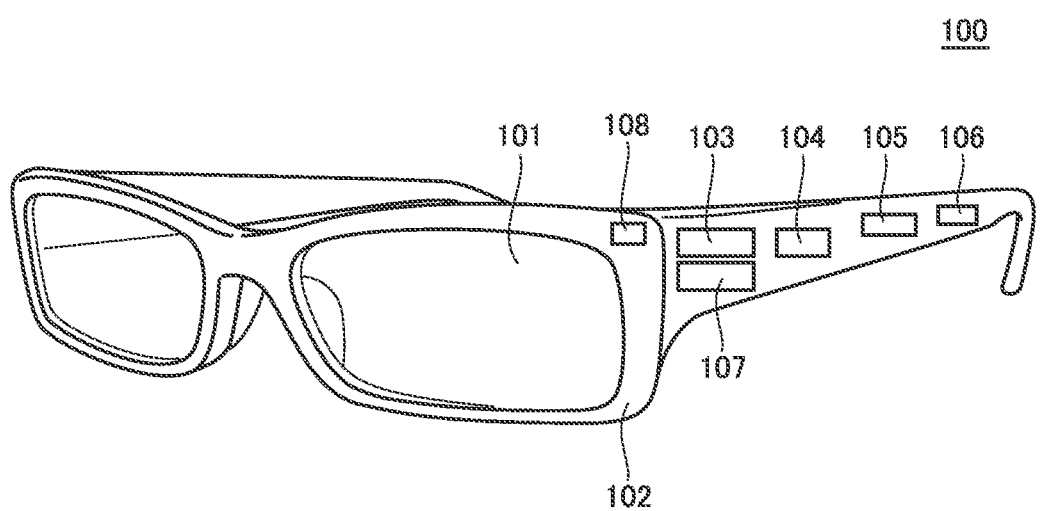
FIG. 1 is a diagram illustrating an example configuration of a pair of autofocus eyeglasses 100 according to an embodiment.

Hereinafter, one or more embodiments of the present disclosure will be described with reference to the drawings. However, the scope of the present disclosure is not limited to the disclosed embodiments.

In the following description, the same components are denoted by the same reference numerals, and have the same names and functions. Therefore, the detailed description thereof will not be repeated.

<A. Basic Configuration>

Firstly, a pair of autofocus eyeglasses according to the present embodiment and a focus adjusting tool configured to perform an initial setting of the pair of autofocus eyeglasses will be described with reference to FIGS. 1 to 3.

FIG. 1 is a diagram illustrating an example configuration of a pair of autofocus eyeglasses 100 according to the present embodiment. The pair of autofocus eyeglasses 100 is capable of changing the power of a lens mounted thereon. Therefore, the same pair of autofocus eyeglasses 100 may be used by a plurality of users with different eyesight. The pair of autofocus eyeglasses 100 has a function of changing the power of a lens. Thereby, the user may appropriately adjust the power of the lens according to a distance from himself/ herself to a visual object.

The pair of autofocus eyeglasses 100 include a power variable lens 101, a frame 102, a control unit 103, an input unit 104, a storage unit 105, a power supply unit 106, a communication unit 107, and a distance sensor 108.

The power variable lens 101 is a power variable lens, in other words, the refractive factor of light into the power variable lens 101 is variable. The power of the left power variable lens 101 and the power of the right power variable lens 101 may be different from each other. In one aspect, the power variable lens 101 may be a liquid crystal lens. The power adjustment of a liquid crystal lens may be achieved by changing the liquid crystal in response to an input voltage. In another aspect, the power variable lens 101 may be a liquid lens. The power adjustment of a liquid lens may be achieved, for example, by adjusting the amount of liquid in the liquid lens by using a pump or the like.

The frame 102 is configured to hold the power variable lens 101 and other components. In one aspect, a part of or all of the power variable lens 101, the control unit 103 and the distance sensor 108 may be detachable from the frame 102. In this case, a user may attach each component to the frame 102 as needed. In another aspect, the frame 102 may be made from resin, metal, wood and any other material, or a combination thereof.

The control unit 103 controls the overall operation of the pair of autofocus eyeglasses 100. The control unit 103 adjusts the power of the left and right power variable lenses 101. The power adjustment of the power variable lens 101 may include, for example, adjusting a voltage applied to the power variable lens 101 or adjusting an amount of liquid in the power variable lens 101. The control unit 103 may adjust the power of the power variable lens 101 based on setting information of the power variable lens 101 acquired from the input unit 104 or the communication unit 107 to be described later.

The setting information may include, for example, power information of the left and right power variable lenses 101. In this case, the control unit 103 may adjust the voltage applied to the power variable lens 101 if it is a liquid crystal lens or the amount of liquid in the power variable lens 101 if it is a liquid lens based on the power information included in the setting information.

In one aspect, the setting information may include position information (distance information) in addition to the power information. The position information (distance information) indicates, for example, a position of a visual object relative to the power variable lens 101 or the user's eye, or a distance from a visual object to the power variable lens 101 or the user's eye. For example, when a visual object is distant from the power variable lens 101 by 10 meters, the position information is 10 meters.

The control unit 103 may use the power information and the position information. For example, suppose that the control unit 103 acquires power information (X) when the position information is (A) and power information (Y) when the position information is (B). In this case, the control unit 103 may adjust the power of the power variable lens 101 according to the power information (X) when the visual object is located at the position (A). Similarly, the control unit 103 may adjust the power of the power variable lens 101 according to the power information (Y) when the visual object is located at the position (B). In one aspect, the control unit 103 may automatically adjust the power of the power variable lens 101 in response to the distance from the power variable lens 101 to the visual object based on a value acquired from the distance sensor 108. In another aspect, the control unit 103 may adjust the power of the power variable lens 101 in response to the distance from the power variable lens 101 to the visual object based on an adjustment instruction inputted from the input unit 104 by the user.

The input unit 104 receives an input of setting information of the power variable lens 101. In one aspect, the input unit 104 may include any input means such as a dial, a touch panel or a button, and receive a user input from the input means. The input unit 104 may receive the power information and the position information inputted by the user.

The storage unit 105 stores setting information to be used by the control unit 103 to adjust the power of the power variable lens 101. The control unit 103 stores the setting information acquired from the input unit 104 or the communication unit 107 in the storage unit 105. The control unit 103 appropriately adjusts the power of the power variable lens 101 based on the setting information stored in the storage unit 105. The storage unit 105 stores a program to be executed by the control unit 103.

The power supply unit 106 provides electric power to the power variable lens 101, the control unit 103, the input unit 104, the storage unit 105, the communication unit 107, and the distance sensor 108. In one aspect, the power supply unit 106 may include a battery (not shown), a voltage transformer (not shown), and a power feeding unit (not shown). The power feeding unit may include any terminal such as a USB (Universal Serial Bus) terminal, and may receive electric power from the outside via the terminal so as to charge the battery. The power supply unit 106 may be easily understood by those skilled in the art. Therefore, the detailed description of the power supply unit 106 will not be repeated.

The communication unit 107 communicates with a focus adjusting tool 300, which will be described later. The communication unit 107 may receive, from the focus adjusting tool 300, setting information to be used by the control unit 103 to adjust the power of the power variable lens 101 or information for generating the setting information. In one aspect, the communication unit 107 may be implemented by a wired LAN (Local Area Network) port, a Wi-Fi (registered trademark) module or the like. In another aspect, the communication unit 107 may transmit and receive data using a communication protocol such as TCP/IP(Transmission Control Protocol/Internet Protocol) or UDP (User Datagram Protocol).

The distance sensor 108 may measure a distance from the power variable lens 101 or the user's eye to the visual object. The distance sensor 108 measures the distance from the power variable lens 101 or the user's eye to the visual object (position information) by any means such as a laser, an infrared ray, an image or ultrasound, or a combination thereof. The distance sensor 108 outputs a signal indicating the measured distance to the control unit 103.

Figure 2:
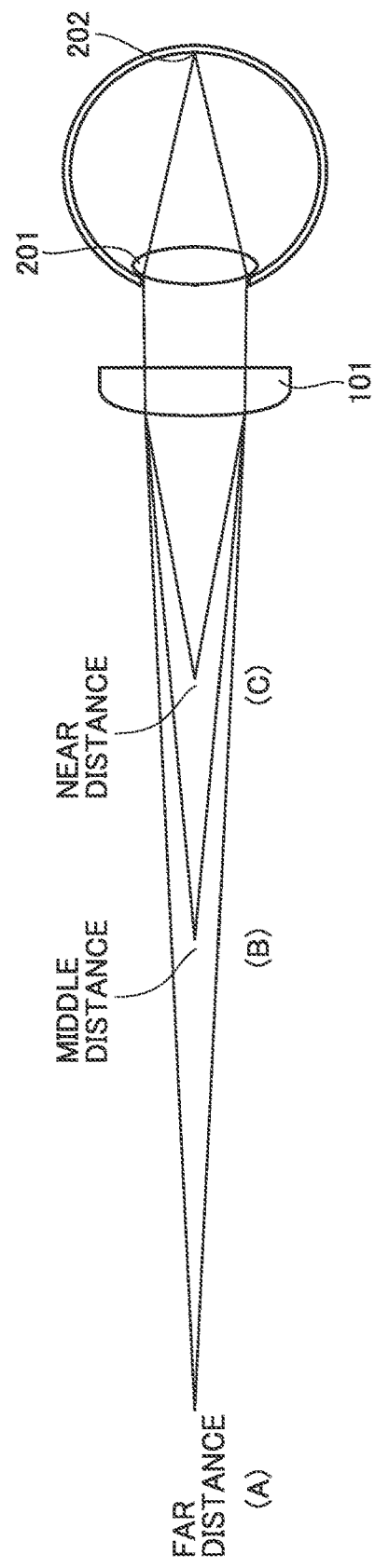
FIG. 2 is a diagram illustrating an example of a power variable lens 101 of the pair of autofocus eyeglasses according to an embodiment.

FIG. 2 is a diagram illustrating an example of the power variable lens 101 of the pair of autofocus eyeglasses according to the present embodiment. As illustrated in the example of FIG. 2, the reflected light from a visual object located at each of a far-distance position (A), a middle-distance position (B), and a near-distance position (C) relative to the power variable lens 101 reaches the power variable lens 101. As described above, the incident angle of light into the power variable lens 101 changes with the different distance from the power variable lens 101 to the visual object. The light passing through the power variable lens 101 passes through a crystalline lens 201 of the user's eye and reaches a retina 202 thereof.

Thus, the control unit 103 appropriately adjusts the refractive factor of the power variable lens 101 in response to the distance from the user's eye or the power variable lens 101 to the visual object with reference to the acquired setting information (the power information and the position information).

In the following description, a visual object located at a far distance, a middle distance, or a near distance relative to the power variable lens 101 is referred to as "a far-distance visual object", "a middle-distance visual object", or "a near-distance visual object", respectively. In addition, the power of the power variable lens 101 when the user is wearing the pair of autofocus eyeglasses 100 to view a far-distance visual object, a middle-distance visual object, or a near-distance visual object is referred to as "a far-distance power", "a middle-distance power", or "a near-distance power", respectively. Further, the position with a far distance, a middle distance, or a near distance relative to the power variable lens 101 is simply referred to as "a far-distance position", "a middle-distance position", or "a near-distance position", respectively.

Figure 3:
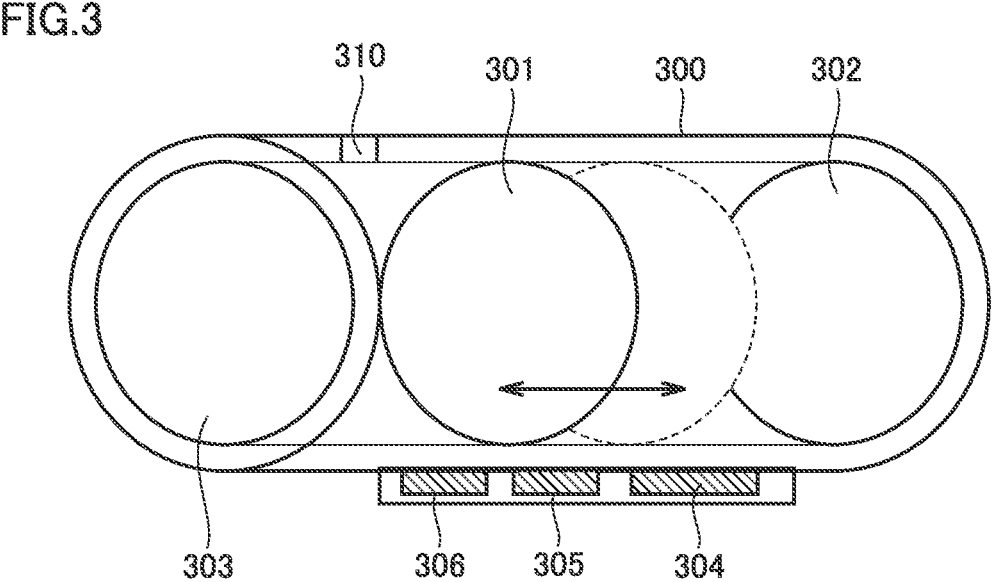
FIG. 3 illustrates an example of a focus adjusting tool 300 according to an embodiment.

FIG. 3 is a diagram illustrating an example of the focus adjusting tool 300 according to the present embodiment. The focus adjusting tool 300 is configured to perform an initial setting of the pair of autofocus eyeglasses 100. Generally, when a user adjusts the power of the pair of autofocus eyeglasses, the user is required to manually set a visual object at a predetermined position (for example, a near-distance position, a middle-distance position, or a far-distance position), and adjust the power of the power variable lens while viewing the visual object set at each position. However, it is difficult to accurately measure the distance from the power variable lens to the visual object by visual measurement, and the user may misplace the visual object. Any misplacement of the visual object may cause an error in the power adjustment of the power variable lens.

It is easier for the user to adjust the power of the power variable lens 101 by using the focus adjusting tool 300 instead of visually measuring and setting the position of the visual object to be used in the initial setting of the pair of autofocus eyeglasses 100.

As an example, the user may use the focus adjusting tool 300 to easily set a far-distance power, a middle-distance power, or a near-distance power of the power variable lens 101 in the pair of autofocus eyeglasses 100.

The focus adjusting tool 300 includes a focus lens 301, a first end 302, a second end 303, an adjusting unit 304, a display unit 305, a communication unit 306, and a light introducing unit 310.

The focus lens 301 may be parallelly moved inside the housing of the focus adjusting tool 300. The adjusting unit 304 receives an input for adjusting the position of the focus lens 301 in the housing. In one aspect, the adjusting unit 304 may be any input means such as a dial, a button, a slider, or a touch panel.

The focus adjusting tool 300 adjusts the position of the focus lens 301 in response to an input from the adjusting unit 304. In one aspect, the focus adjusting tool 300 may include a power transmission unit (not shown) or a driving unit (not shown) configured to move the focus lens 301 based on an input from the adjusting unit 304.

The first end 302 is provided with a hole so as to bring the power variable lens 101 of the pair of autofocus eyeglasses 100 into close contact with the first end 302. The user who wears the pair of autofocus eyeglasses 100 uses the focus adjusting tool 300 in such a manner that the user firstly brings either the right power variable lens 101 or the left power variable lens 101 into close contact with the first end 302 and looks into the first end 302.

A visual object to be used in the initial setting is located on the second end 303. In one aspect, the second end 303 may be a wall or a lid, and the visual object may be drawn on the surface of the second end 303 inside the housing. In another aspect, a stereoscopic visual object may be presented on the surface of the second end 303 inside the housing. In another aspect, the second end 303 may be provided with a hole so as to bring a screen of a smartphone that displays a moving picture or an image of a visual object into close contact with the second end 303. Further, in another aspect, instead of a screen of a smartphone, the user may bring a piece of paper or the like on which an image of a visual object is drawn into close contact with a hole provided in the second end 303.

In any case, the user who wears the pair of autofocus eyeglasses 100 looks at the visual object located on the second end 303 from the first end 302. As the position of the focus lens 301 is changed, the incident angle of the reflected light from the visual object to the power variable lens 101 changes accordingly. In other words, when the position of the focus lens 301 is changed, it appears that the visual object is moved close to or distant from the user. In other words, the focus adjusting tool 300 is used by a user who wears the pair of autofocus eyeglasses 100 to view a pseudo visual object at an arbitrary distance such as a near distance, a middle distance, or a far distance, and the adjusting unit 304 adjusts the position of the visual object.

In the following description, the position of the focus lens 301 when the user who wears the pair of autofocus eyeglasses 100 looks at a visual object located on the second end 303 as a pseudo near-distance visual object is referred to as "a near-distance position". Similarly, the position of the focus lens 301 when the user who wears the pair of autofocus eyeglasses 100 looks at a visual object located on the second end 303 as a pseudo middle-distance visual object is referred to as "a middle-distance position", and the position of the focus lens 301 when the user who wears the pair of autofocus eyeglasses 100 looks at a visual object located on the second end 303 as a pseudo far-distance visual object is referred to as "a far-distance position".

In one aspect, when a button or the like in the adjusting unit 304 is pressed, the adjusting unit 304 is caused to automatically move the focus lens 301 to a predetermined position such as a near-distance position, a middle distance position, or a far-distance position.

In another aspect, the housing of the focus adjusting tool 300 may be provided with a mark indicating the position to be used for the initial adjustment of the pair of autofocus eyeglasses 100, and the position of the focus lens 301 inside the housing of the focus adjusting tool 300 may be confirmed from the outside of the housing. In this case, the user may move the focus lens 301 in accordance with the mark.

The display unit 305 displays the current position of the focus lens, in other words, the position information of the visual object to the user. For example, when the display unit 305 displays the position information (A), the user is viewing a pseudo visual object separated from the user's eye or the power variable lens 101 by the distance (A). In one aspect, the display unit 305 may include any display means such as a dial, a liquid crystal display, or an organic EL (Electro Luminescence) display. The user may input the power information from the input unit 104 of the pair of autofocus eyeglasses 100 with reference to the information (the position information of the visual object relative to the power variable lens 101) displayed on the display unit 305 so as to adjust the power of the power variable lens 101.

The communication unit 306 communicates with the communication unit 107 of the pair of autofocus eyeglasses 100. The communication unit 306 transmits, to the pair of autofocus eyeglasses 100, the position information of the visual object which is set by the adjusting unit 304 (and changes according to the input from the adjusting unit 304).

In one aspect, the communication unit 306 may transmit, to the pair of autofocus eyeglasses 100, the power information calculated by a control unit 307 based on the position information of the visual object. The power information may be, for example, the default power information for the position information set by the adjusting unit 304. The pair of autofocus eyeglasses 100 may adjust the power of the power variable lens 101 based on the received power information.

After the power of the power variable lens 101 is adjusted by the pair of autofocus eyeglasses 100 based on the received power information, the user may further finely adjust the power of the power variable lens 101 so as to suit himself/herself by inputting the power information via the input unit 104. As a result, the user may complete the power adjustment only by finely adjusting the power of the focus lens 301 so as to suit himself/herself.

The light introducing unit 310 is a window configured to introduce light into the focus adjusting tool 300, particularly to a position near the second end 303. In the case where a visual object is drawn on the wall surface of the second end 303 or the like, the light introducing unit 310 introduces light from the outside so as to generate reflected light from the visual object. In one aspect, the light introducing unit 310 may include a light emitting element such as an LED (Light Emitting Diode) instead of introducing light. In another aspect, on the assumption that the focus adjusting tool 300 is configured to use an image displayed on a screen of a smartphone or the like as the visual object, the light introducing unit 310 may not be provided in the focus adjusting tool 300.

As described above, unlike the conventional method of initially setting a pair of autofocus eyeglasses, the focus adjusting tool 300 does not require the user to change the position of the visual object by visual measurement. The user may accurately change the position of the visual object simply by adjusting the position of the focus lens 301, which makes it possible for the user to more accurately and easily adjust the power of the power variable lens 101.

<B. Outline of Power Adjustment of Power Variable Lens 101>

Figure 4:
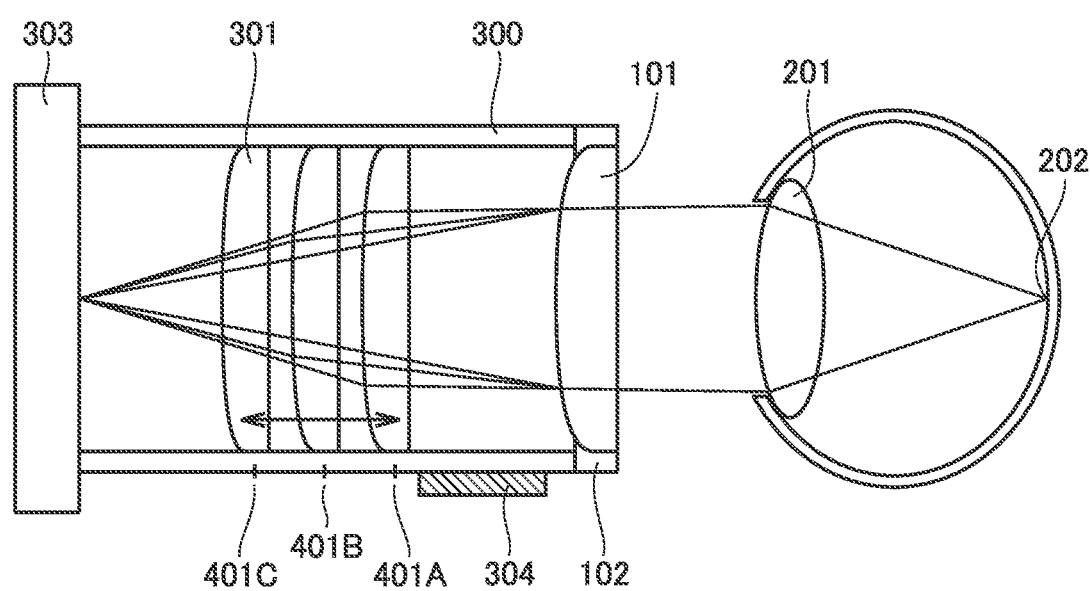
FIG. 4 is a diagram schematically illustrating an example usage of the focus adjusting tool 300.

Next, a method of adjusting the power of the power variable lens 101 using the focus adjusting tool 300 will be described in detail with reference to FIG. 4. In the example of FIG. 4, the second end 303 is described as a wall or a lid on which a visual object is drawn, but this is an example, and the present embodiment is not limited thereto. As described above, the second end 303 may be provided with a hole so as to bring a screen of a smartphone or a piece of paper into close contact with the second end 303.

FIG. 4 is a diagram schematically illustrating an example usage of the focus adjusting tool 300. With reference to FIG. 4, the description will be given on a process in which a user sets a far-distance power, a middle-distance power, or a near-distance power of the power variable lens 101 using the focus adjusting tool 300. The following power adjustment of the power variable lens 101 is performed on each of the left and right power variable lenses 101.

In step S1, the user brings the frame 102 of the pair of autofocus eyeglasses 100 into close contact with the first end 302 of the focus adjusting tool 300. At this time, a part of the focus adjusting tool 300 contacts the frame 102. In this state, the user visually observes a visual object drawn on the surface of the second end 303 through any one of the right and left power variable lenses 101.

In step S2, the user moves the focus lens 301 to a position 401A (far-distance position) using the adjusting unit 304. When the focus lens 301 is located at the position 401A, it appears to the user that the visual object is located at the far-distance position.

In step S3, the user adjusts the far-distance power of the power variable lens 101 via the input unit 104 with reference to the position information of the visual object displayed on the display unit 305.

The control unit 103 stores the input power of the power variable lens 101 in the storage unit 105. The control unit 103 may change the power of the power variable lens 101 to the power adjusted in this step based on an instruction inputted from the input unit 104 or a signal received from the distance sensor 108 when the user visually observes a far-distance visual object the next time.

In step S4, the user moves the focus lens 301 to a position 401B (middle-distance position) using the adjusting unit 304. When the focus lens 301 is located at the position 401B, it appears to the user that the visual object is located at the middle-distance position.

In step S5, the user adjusts the middle-distance power of the power variable lens 101 via the input unit 104 with reference to the position information of the visual object displayed on the display unit 305.

The control unit 103 stores the input power of the power variable lens 101 in the storage unit 105. The control unit 103 may change the power of the power variable lens 101 to the power adjusted in this step based on an instruction inputted from the input unit 104 or a signal received from the distance sensor 108 when the user visually observes a middle-distance visual object the next time.

In step S6, the user moves the focus lens 301 to a position 401C (near-distance position) using the adjusting unit 304. When the focus lens 301 is located at the position 401C, it appears to the user that the visual object is located at the near-distance position.

In step S7, the user adjusts the near-distance power of the power variable lens 101 via the input unit 104 with reference to the position information of the visual object displayed on the display unit 305.

The control unit 103 stores the input power of the power variable lens 101 in the storage unit 105. The control unit 103 may change the power of the power variable lens 101 to the power adjusted in this step based on an instruction inputted from the input unit 104 or a signal received from the distance sensor 108 when the user visually observes a near-distance visual object the next time.

In one aspect, the control unit 103 may receive position information (a pseudo distance from the power variable lens to the visual object created through the intermediary of the focus lens 301) of the visual object from the focus adjusting tool 300 via the communication unit 107. In this case, the control unit 103 may automatically adjust the power of the power variable lens 101 based on the position information. After the automatic adjustment, the control unit 103 may receive power information for fine adjustment inputted by the user from the input unit 104 and adjust the power of the power variable lens 101 based on the inputted power information.

As described above, after bringing the focus adjusting tool 300 into close contact with the pair of autofocus eyeglasses 100, the user may easily complete the power adjustment of the power variable lens 101 at a plurality of distances (for example, a near distance, a middle distance, and a far distance) without physically moving the visual object.

<C. Circuit Components>

Figure 5:
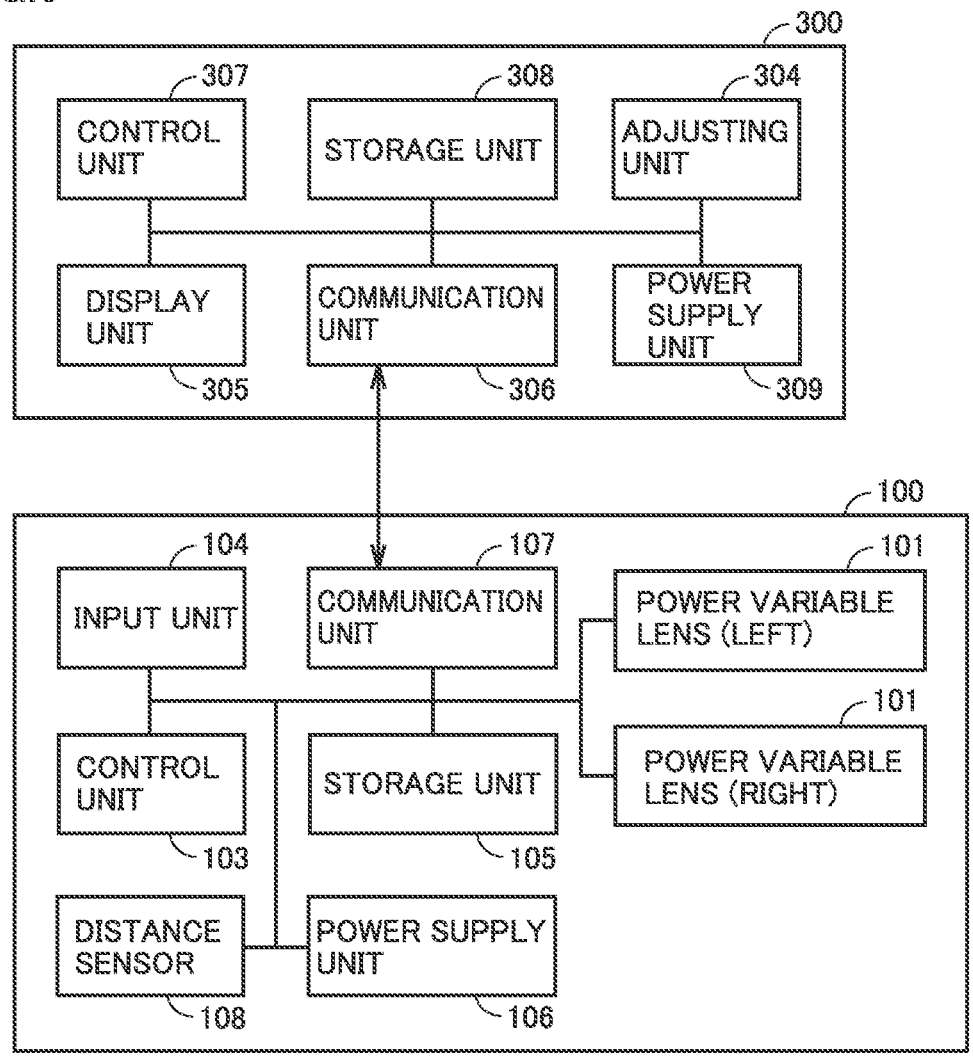
FIG. 5 is a diagram illustrating example circuit components of the pair of autofocus eyeglasses 100 and the focus adjusting tool 300.

FIG. 5 is a diagram illustrating example circuit components of the pair of autofocus eyeglasses 100 and the focus adjusting tool 300. The circuit components of the pair of autofocus eyeglasses 100 and the focus adjusting tool 300 will be described with reference to FIG. 5.

The pair of autofocus eyeglasses 100 includes the power variable lens 101, the control unit 103, the input unit 104, the storage unit 105, the power supply unit 106, the communication unit 107, and the distance sensor 108 as the circuit components.

When the power variable lens 101 is a liquid crystal lens, the power variable lens 101 is used together with a terminal for applying a voltage and a peripheral circuit for adjusting the voltage. When the power variable lens 101 is a liquid lens, the power variable lens 101 may be used together with a pump, a control circuit thereof and the like.

The communication unit 107 communicates with the communication unit 306 of the focus adjusting tool 300 to acquire the position information of a visual object. The position information of the visual object (the distance from the power variable lens 101) is determined by the position of the focus lens 301. Therefore, in one aspect, the communication unit 107 may receive the position information of the focus lens 301. In this case, the control unit 103 may calculate the position information of the visual object based on the position information of the focus lens 301.

In addition to the adjusting unit 304, the display unit 305, and the communication unit 306 described with reference to FIG. 3, the focus adjusting tool 300 includes a control unit 307, a storage unit 308, and a power supply unit 309 as the circuit components.

The control unit 307 controls the operation of circuits and electronic components provided in the focus adjusting tool 300. For example, the control unit 307 may control an actuator configured to drive the focus lens 301, the display unit 305, the communication unit 306 and the like.

The storage unit 308 temporarily stores the position information and the like of the focus lens 301 adjusted by the adjusting unit 304. The storage unit 308 further stores a program to be executed by the control unit 307.

The power supply unit 309 supplies power to circuits and electronic components provided in the focus adjusting tool 300. In one aspect, the power supply unit 309 may include a battery, or may include a terminal to receive electrical power from the outside.

In one aspect, if the focus adjusting tool 300 does not include any electronic components, the control unit 307 and the power supply unit 309 may not be provided in the focus adjusting tool 300. In another aspect, if the pair of autofocus eyeglasses 100 has only an input function of receiving an input from a user without a communication function, the communication unit 306 may not be provided in the focus adjusting tool 300. In another aspect, if the focus adjusting tool 300 includes the communication unit 306, the display unit 305 may not be provided in the focus adjusting tool 300.

<Flow Chart>

Next, a processing procedure to be performed by the focus adjusting set composed of the pair of autofocus eyeglasses 100 and the focus adjusting tool 300 will be described with reference to FIGS. 6 to 8. In one aspect, the control unit 103 may read, from the storage unit 105, a program to cause the auto focus glasses 100 to perform the processes illustrated in FIGS. 6 to 8 and execute the program. In another aspect, a part of or all of the processes may be implemented as a combination of circuit elements configured to perform the process.

Figure 6:
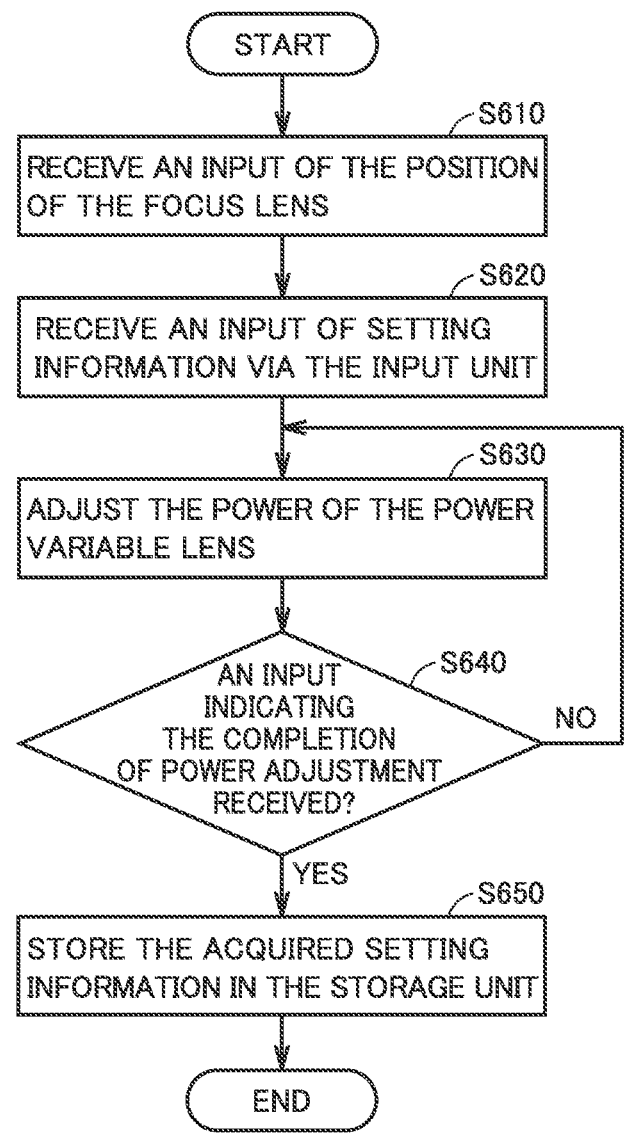
FIG. 6 is a diagram illustrating a first example of an adjusting process for adjusting the power of a power variable lens 101 of the pair of autofocus eyeglasses 100.
Figure 7:
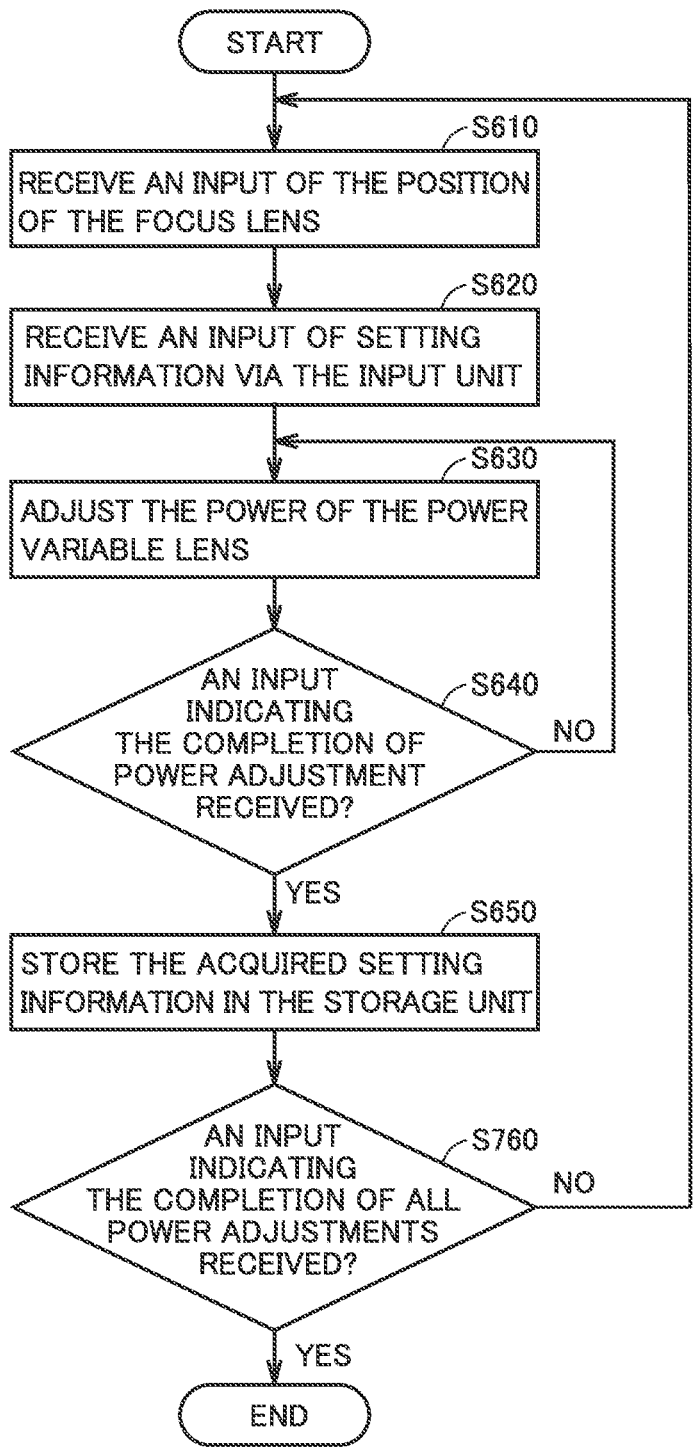
FIG. 7 is a diagram illustrating a second example of an adjusting process for adjusting the power of the power variable lens 101 of the pair of autofocus eyeglasses 100.
Figure 8:
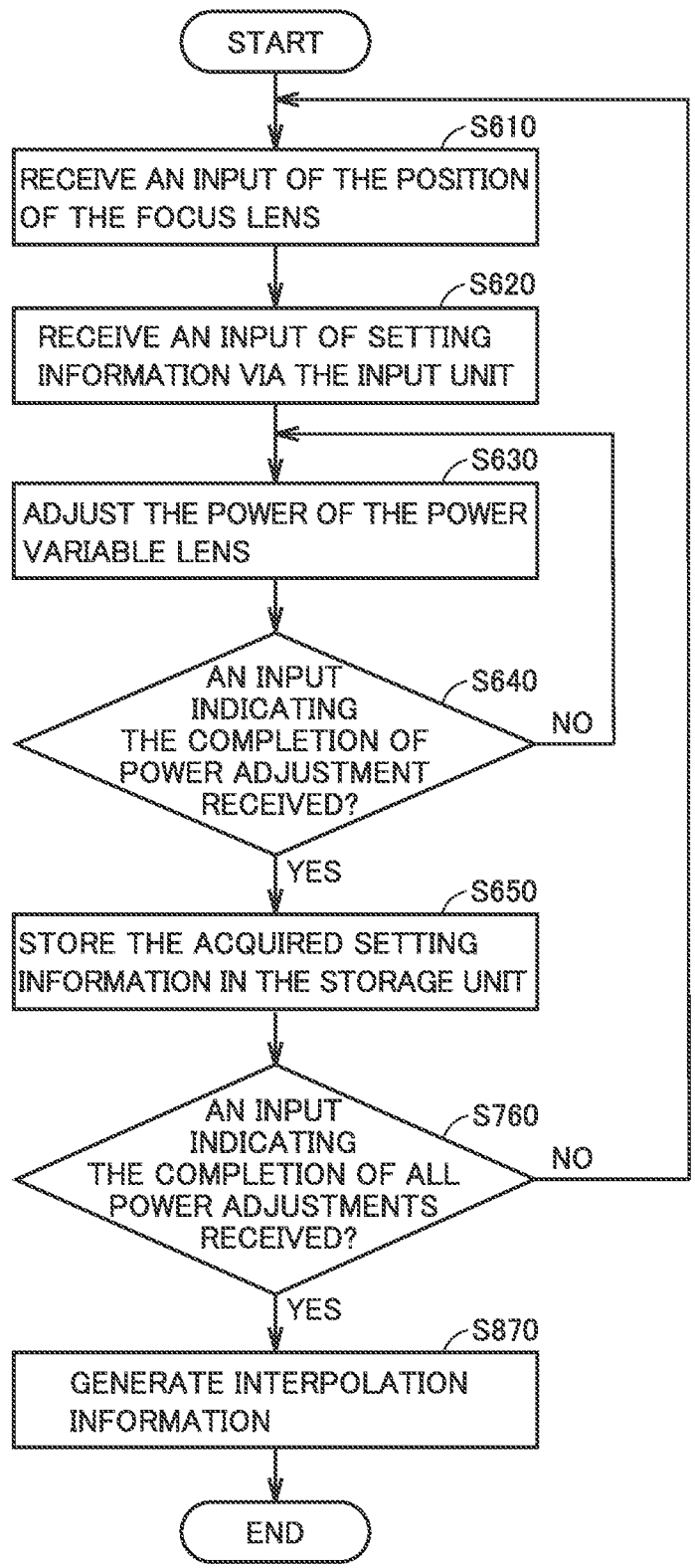
FIG. 8 is a diagram illustrating a third example of an adjusting process for adjusting the power of the power variable lens 101 of the pair of autofocus eyeglasses 100.

In one aspect, the control unit 307 may read, from the storage unit 308, a program to cause the focus adjusting tool 300 to perform the processes illustrated in FIGS. 6 to 8 and execute the program. In another aspect, a part of or all of the processes may be implemented as a combination of circuit elements configured to perform the process.

FIG. 6 is a diagram illustrating a first example of an adjusting process for adjusting the power of the power variable lens 101 of the pair of autofocus eyeglasses 100. In step S610, the control unit 307 receives an input for adjusting the position of the focus lens 301 from the user via the adjusting unit 304. The display unit 305 displays the position information of the visual object. The position information is a pseudo distance from the power variable lens 10 to the visual object created through the intermediary of the focus lens 301.

In step S620, the control unit 103 receives an input of setting information (the position information and the power information) from the user via the input unit 104. The user inputs the position information displayed on the display unit 305 in step S610 and the power information to the input unit 104. The control unit 103 acquires the power information of the power variable lens 101 and the position information of the visual object.

In step S630, the control unit 103 adjusts the power of the power variable lens 101 based on the acquired power information. In one aspect, the control unit 103 may adjust the voltage applied to the power variable lens 101 when it is a liquid crystal lens. In another aspect, the control unit 103 may adjust the amount of liquid in the power variable lens 101 by using a pump or the like when it is a liquid lens.

In step S640, the control unit 103 determines whether an input indicating the completion of power adjustment of the power variable lens 101 has been received via the input unit 104. As an example, the input unit 104 may include a button or the like for receiving an input indicating the completion of power adjustment. When the control unit 103 determines that an input indicating the completion of power adjustment of the power variable lens 101 has been received (YES in step S640), the control unit 103 proceeds the process to step S650. Otherwise (YES in step S640), the control unit 103 proceeds the process to step S630.

In step S650, the control unit 103 stores the acquired setting information (the position information of the visual object and the power information) in the storage unit 105. The setting information is used to adjust the power of the power variable lens 101 when the user uses the pair of autofocus eyeglasses 100 to view a certain object.

FIG. 7 is a diagram illustrating a second example of an adjusting process for adjusting the power of the power variable lens 101 of the pair of autofocus eyeglasses 100. The flowchart of FIG. 7 differs from the flowchart of FIG. 6 in that the power adjustment of the power variable lens 101 is repeatedly executed until the power adjustment of the power variable lens 101 is completed at a plurality of distances (the far distance, the middle distance and the near distance).

In step S760, the control unit 103 determines whether or not an input indicating the completion of all power adjustments has been received from the user via the input unit 104. When the control unit 103 determines that an input indicating the completion of all power adjustments has been received from the user (YES in step S760), the control unit 103 ends the process. Otherwise (NO in step S760), the control unit 103 proceeds the process to step S610. Then, the control unit 103 receives an input of the position information of a different visual object and an input of the power information from the user, and adjusts the power of the power variable lens 101 once more.

FIG. 8 is a diagram illustrating a third example of an adjusting process for adjusting the power of the power variable lens 101 of the pair of autofocus eyeglasses 100. The flowchart of FIG. 8 differs from the flowcharts of FIGS. 6 and 7 in that an interpolation information for focusing the power variable lens 101 is generated.

In step S870, the control unit 103 generates an interpolation information based on the setting information (the position information and the power information) stored in the processing from steps S610 to S760. The "interpolation information" is, for example, "the power of the power variable lens 101 when the visual object is located at any position other than the position (A) or (B)" obtained by an interpolation calculation based on "the power of the power variable lens 101 when the visual object is located at the position (A)" and "the power of the power variable lens 101 when the visual object is located at the position (B)".

In one aspect, the interpolation information may be data of a calculation formula generated based on a plurality of pieces of setting information (the position information and the power information) stored in the storage unit 105. In another aspect, the interpolation information may be power information generated for another position based on a plurality of pieces of setting information stored in the storage unit 105. In one aspect, the interpolation information is not required to be generated by the control unit 103 preliminarily, and it may be generated by the control unit 103 dynamically based on a plurality of pieces of setting information stored in the storage unit 105 as needed. The pair of autofocus eyeglasses 100 may use the interpolation information to appropriately adjust the power of the power variable lens 101 even when the visual object is located at a position where the power of the power variable lens 101 is not previously adjusted by the user.

In one aspect, the pair of autofocus eyeglasses 100 may select a piece of power information stored in the storage unit 105 based on the receipt of an input for selecting the power of the power variable lens 101 or the position information (50 centimeters, 2 meters or the like) of a visual object from the user via the input unit 104, and adjust the power of the power variable lens 101 based on the piece of power information.

In another aspect, the pair of autofocus eyeglasses 100 may select a piece of power information stored in the storage unit 105 based on an input signal (position information of a visual object) from the distance sensor 108, and adjust the power of the power variable lens 101 based on the piece of power information.

In another aspect, the pair of autofocus eyeglasses 100 may adjust, based on the interpolation information, the power of the power variable lens 101 with respect to a visual object located at a distance other than the distance where the power of the power variable lens 101 is set in the initial setting.

As described above, by using the focus adjusting tool 300 according to the present embodiment, the user may pseudo-view a visual object located at each of a plurality of different positions (in other words, the distances from the power variable lens 101 are different). This function eliminates the need for the user to manually reposition the visual object at a plurality of positions when adjusting the power of the power variable lens 101 in the pair of autofocus eyeglasses 100. As a result, it is easier for the user to accurately complete the power adjustment of the power variable lens 101.

The power variable lens 101 may generate interpolation information based on the power information obtained at a plurality of predetermined distances. The pair of autofocus eyeglasses 100 may use the interpolation information to appropriately adjust the power of the power variable lens 101 even when the visual object is located at a position where the power of the power variable lens 101 is not previously adjusted by the user.

Although embodiments of the present disclosure have been described and illustrated in detail, the disclosed embodiments are made for the purpose of illustration and example only and not limitation. The scope of the present disclosure should be interpreted by terms of the appended claims

What is claimed is:

1. A focus adjusting tool comprising:
an adjusting lens that refracts reflected light from a visual object;
a housing including an inner space that allows a parallel movement of the adjusting lens;
an adjusting unit that adjusts a position of the adjusting lens inside the housing; and
a first end and a second end in a movement direction of the adjusting lens,
the first end being provided with a hole for visually observing a visual object through a power variable lens of a pair of autofocus eyeglasses,
the adjusting lens adjusting, in response to the position thereof inside the housing, an incident angle of the reflected light from the visual object into the power variable lens, the visual object being located on the side of the second end.

2. The focus adjusting tool according to claim 1, wherein the second end is provided with a wall, and
the visual object is drawn or disposed on a surface of the wall inside the housing.

3. The focus adjusting tool according to claim 2, wherein the housing includes a light introducing unit to allow light to reach a position on the second end.

4. The focus adjusting tool according to claim 1, wherein the second end is provided with a hole so as to overlap a display surface that displays a moving picture or an image of the visual object with the second end.

5. The focus adjusting tool according to claim 1 further including a display unit that displays information for adjusting the power of the power variable lens, wherein
the display unit changes information to be displayed based on the position of the adjusting lens inside the housing.

6. The focus adjusting tool according to claim 5, wherein the information for adjusting the power of the power variable lens is position information of the visual object relative to the power variable lens.

7. The focus adjusting tool according to claim 1 further including a communication unit that transmits information for adjusting the power of the power variable lens to the pair of autofocus eyeglasses, wherein
the information for adjusting the power of the power variable lens is changed based on the position of the adjusting lens inside the housing.

8. A focus adjusting set comprising:
a pair of autofocus eyeglasses; and
a focus adjusting tool,
the pair of autofocus eyeglasses including:
    a power variable lens;
    a power adjusting unit that adjusts the power of the power variable lens;
    a storage unit that stores power information of the power variable lens; and
    a control unit that controls the pair of autofocus eyeglasses,
the focus adjusting tool including:
    an adjusting lens that refracts reflected light from a visual object;
    a housing including an inner space that allows a parallel movement of the adjusting lens;
    an adjusting unit that adjusts a position of the adjusting lens inside the housing;
    a display unit that displays position information of the visual object relative to the power variable lens; and
    a first end and a second end in a movement direction of the adjusting lens,
the first end being provided with a hole for visually observing the visual object via the power variable lens,
the adjusting lens adjusting, in response to the position thereof inside the housing, an incident angle of the reflected light from the visual object into the power variable lens, the visual object being located on the side of the second end,
the control unit being configured to:
    acquire first position information displayed by the display unit and first power information corresponding to the first position information from the power adjusting unit;
    acquire second position information displayed by the display unit and second power information corresponding to the second position information from the power adjusting unit; and
    store the first and second power information for adjusting the power of the power variable lens and the first and second position information in the storage unit.

9. The focus adjusting set according to claim 8, wherein the control unit performs an interpolation calculation for focusing the power variable lens based on the first and second power information and the first and second position information, and adjusts the power of the power variable lens based on the result of the interpolation calculation.

10. The focus adjusting set according to claim 8, wherein the pair of autofocus eyeglasses further include a first communication unit,
the focus adjusting tool further includes a second communication unit, and
the first communication unit communicates with the second communication unit to receive the position information of the visual object relative to the power variable lens.

* * * * *